United States Patent
Azevedo

(10) Patent No.: US 10,202,936 B2
(45) Date of Patent: Feb. 12, 2019

(54) ZERO OIL COOLED (ZOC) PISTON INCORPORATING HEAT PIPE TECHNOLOGY

(71) Applicant: FEDERAL-MOGUL CORPORATION, Southfield, MI (US)

(72) Inventor: Miguel Azevedo, Ann Arbor, MI (US)

(73) Assignee: Tenneco Inc., Lake Forest, IL (US)

(*) Notice: Subject to any disclaimer, the term of this patent is extended or adjusted under 35 U.S.C. 154(b) by 643 days.

(21) Appl. No.: 14/682,649

(22) Filed: Apr. 9, 2015

(65) Prior Publication Data
US 2016/0298572 A1    Oct. 13, 2016

(51) Int. Cl.
| | |
|---|---|
| *F02F 3/00* | (2006.01) |
| *F02F 3/18* | (2006.01) |
| *C23C 4/134* | (2016.01) |
| *B22D 19/00* | (2006.01) |
| *B23K 31/02* | (2006.01) |
| *B23P 15/10* | (2006.01) |
| *F02F 3/22* | (2006.01) |

(52) U.S. Cl.
CPC ........ *F02F 3/0092* (2013.01); *B22D 19/0027* (2013.01); *B23K 31/02* (2013.01); *B23P 15/10* (2013.01); *C23C 4/134* (2016.01); *F02F 3/0015* (2013.01); *F02F 3/0076* (2013.01); *F02F 3/18* (2013.01); *F02F 3/22* (2013.01)

(58) Field of Classification Search
CPC .......... F02F 3/22; F02F 3/0015; F02F 3/0076; F02F 3/0092; F02F 3/18; B23P 15/10; B22D 19/0027; C23C 4/134; B23K 31/02
See application file for complete search history.

(56) References Cited

U.S. PATENT DOCUMENTS

| | | | |
|---|---|---|---|
| 1,494,483 | A | 5/1924 | Howe |
| 2,136,416 | A | 11/1938 | Dehn |
| 2,178,993 | A | 11/1939 | Hill |
| (Continued) | | | |

FOREIGN PATENT DOCUMENTS

| | | |
|---|---|---|
| DE | 102012009030 A1 | 11/2013 |
| EP | 0086284 A1 | 8/1983 |
| (Continued) | | |

OTHER PUBLICATIONS

International Search Report, dated Jun. 15, 2016 (PCT/US2016/026869).

*Primary Examiner* — Abiy Teka
(74) *Attorney, Agent, or Firm* — Robert L Stearns; Dickinson Wright, PLLC

(57) ABSTRACT

A steel piston for heavy-duty diesel engines designed with features that increase adiabaticity, reduce weight, and improve passive cooling without loss of power density is provided. The piston includes a pair of skirt walls extending longitudinally from a crown to a lower end. The skirt walls include a plurality of heat sink wells extending axially from the crown to a lower end of the skirt wall. Each heat sink well is at least partially filled with a cooling medium and is sealed. The piston also includes a plurality of ribs each radially aligned with one of the heat sink wells and extending inwardly and upwardly from a first rib end at an inner surface of the skirt wall to a second rib end at the inner surface of the crown.

20 Claims, 3 Drawing Sheets

(56) References Cited

U.S. PATENT DOCUMENTS

| | | | | |
|---|---|---|---|---|
| 2,787,505 | A * | 4/1957 | Laraque | F02F 3/0023 123/41.38 |
| 2,817,562 | A | 12/1957 | Fleming et al. | |
| 3,091,502 | A | 5/1963 | Cass | |
| 3,104,922 | A | 9/1963 | Baster | |
| 3,173,345 | A | 3/1965 | Thompson | |
| 3,292,244 | A | 12/1966 | Cass | |
| 3,742,823 | A | 7/1973 | Fiedler | |
| 3,834,719 | A | 9/1974 | Shin et al. | |
| 4,552,057 | A | 11/1985 | Mizuhara | |
| 4,604,945 | A | 8/1986 | Mizuhara | |
| 4,651,629 | A | 3/1987 | Castarede | |
| 5,085,185 | A | 2/1992 | Heshmat | |
| 5,454,351 | A * | 10/1995 | Cao | F02F 3/18 123/41.35 |
| 6,588,320 | B2 * | 7/2003 | Gaiser | B23P 15/10 92/231 |
| 8,714,129 | B2 | 5/2014 | Bauer | |
| 8,899,208 | B2 * | 12/2014 | Bischofberger | F02F 3/18 123/193.6 |
| 2004/0140111 | A1 * | 7/2004 | Scharp | B23B 35/00 173/1 |
| 2005/0087153 | A1 * | 4/2005 | Moon | F02F 3/18 123/193.6 |
| 2007/0084449 | A1 * | 4/2007 | Najt | F01L 3/04 123/668 |
| 2011/0114038 | A1 | 5/2011 | Lemke et al. | |
| 2013/0206095 | A1 | 8/2013 | Azevedo et al. | |
| 2014/0260957 | A1 * | 9/2014 | Hempston | F02F 3/00 92/172 |

FOREIGN PATENT DOCUMENTS

| | | |
|---|---|---|
| FR | 2333962 A1 | 7/1977 |
| GB | 399801 A | 10/1933 |

\* cited by examiner

ZERO OIL COOLED (ZOC) PISTON INCORPORATING HEAT PIPE TECHNOLOGY

BACKGROUND OF THE INVENTION

1. Field of the Invention

This invention relates generally to pistons for internal combustion engines, and methods for manufacturing the same.

2. Related Art

Pistons used in internal combustion engines, such as heavy-duty steel diesel pistons, are exposed to extremely high temperatures during operation, for example surface surfaces up to 400° C. To moderate temperatures, the piston is typically designed with a cooling gallery beneath the crown, and cooling oil is sprayed into the cooling gallery as the piston reciprocates along a cylinder bore of the engine. As the piston reciprocates, the oil splashes along the inner surface of the crown to dissipate heat away from the crown and toward a cooler portion of the piston and ultimately to the sump oil. However, to effectively control the piston temperature during operation, a high flow of oil must be maintained constantly using lubricant oil pumps, which are oftentimes over-dimensioned and lead to parasitic losses.

Energy efficiency of heavy-duty diesel engines could be improved, as approximately 40% of the energy generated leaves the engine unused, 20% is rejected to the cooling system, and only about 40% is left over to generate useful power at the crankshaft end. Many efforts have been made to improve fuel economy and ultimately reduce the carbon footprint associated with the use of fossil fuels, but such efforts are limited by the geometry of the engine and other factors.

SUMMARY OF THE INVENTION

One aspect of the invention provides a piston for an internal combustion engine designed with features that increase adiabaticity, reduce weight, and improve passive cooling without loss of power density. The design features are not limited by the geometry of the engine and optimize cooling performance without parasitic losses in the form of over-dimensioned lubricant oil pumps. The improved piston design is ultimately capable of improving energy efficiency, and reducing fuel consumption and the carbon footprint associated with the use of fossil fuels.

The piston includes a body formed of a metal material extending along a center axis from an upper end to a lower end and presenting an outer surface and an inner surface. The body includes a crown having an upper wall at the upper end and skirt walls extending longitudinally from the crown to the lower end. The piston includes a plurality of heat sink wells extending axially through the skirt walls from the crown toward the lower end. Each heat sink well is at least partially filled with a cooling medium and is sealed. The piston also includes a plurality of ribs each extending radially inwardly from a first rib end at the inner surface of the skirt wall to a second rib end at the inner surface of the upper wall of the crown.

Another aspect of the invention provides a method of manufacturing the piston for the internal combustion engine with features that increase adiabaticity, reduce weight, and improve passive cooling without loss of power density.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
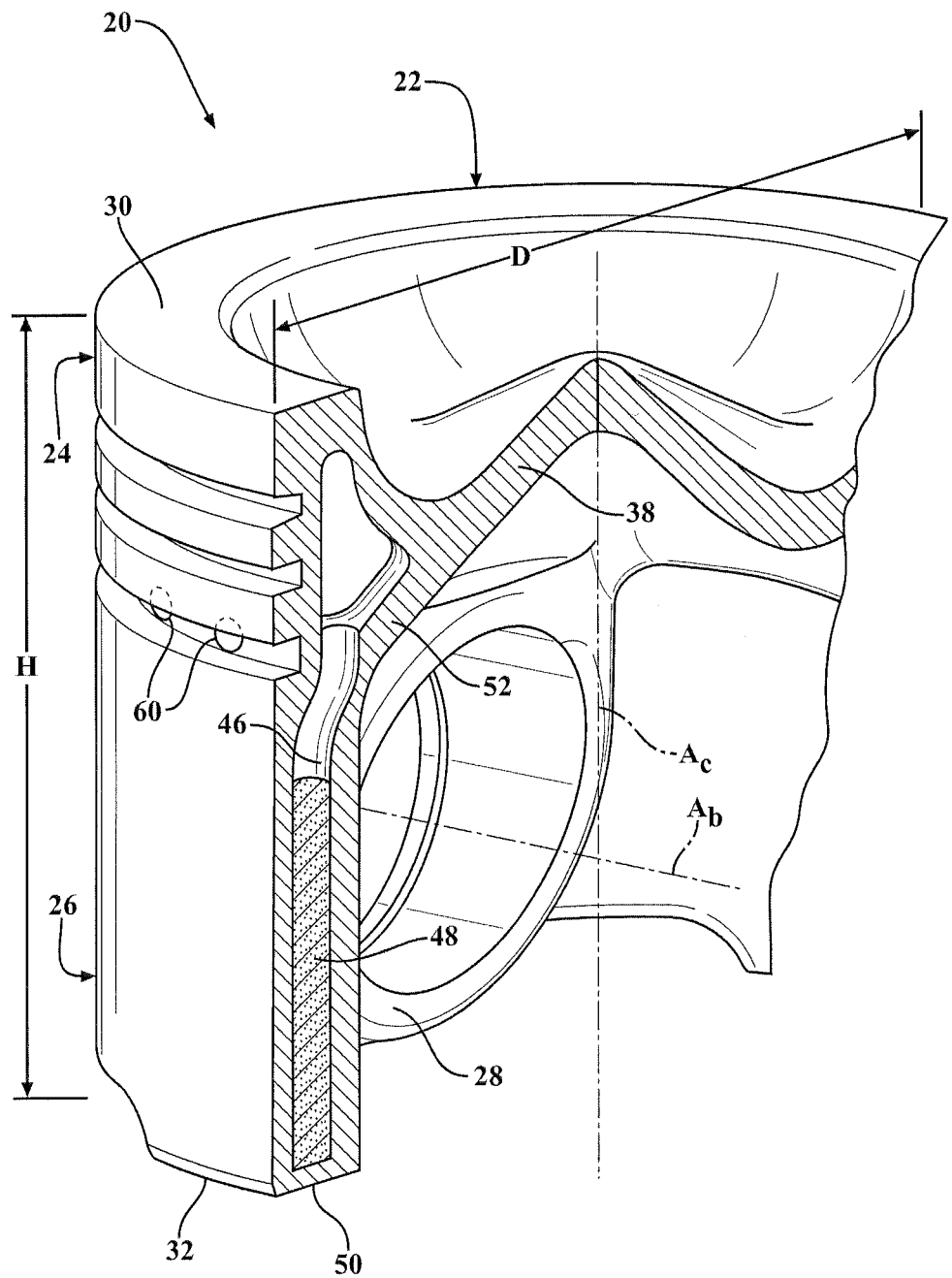
FIG. 1 is a partially cross-sectioned perspective view of a piston constructed according to one example embodiment of the invention.
Figure 2:
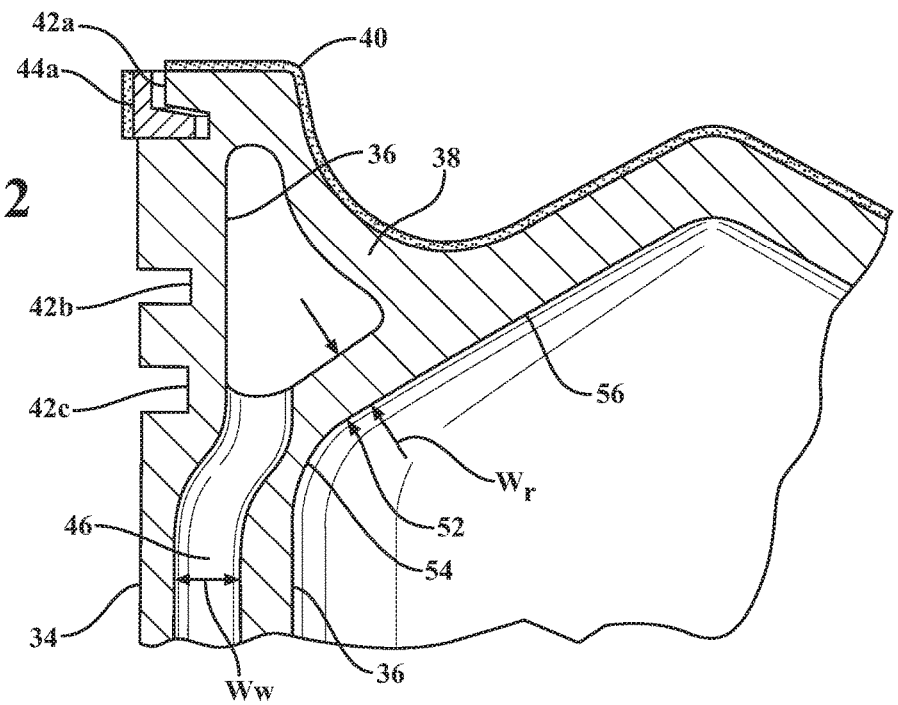
FIG. 2 is a cross-sectional side view of the piston of FIG. 1.

Referring to the Figures, wherein like numerals indicate corresponding parts throughout the several views, an exemplary heavy-duty diesel piston 20 for an internal combustion engine is shown in FIGS. 1-5. The piston 20 includes a body 22 cast or forged from a metal material, typically a steel material. The body 22 generally includes a crown 24, a pair of skirt walls 26 extending longitudinally from the crown 24 and spaced from one another circumferentially about a center axis $A_c$ by a pair of pin bosses 28. The body 22 of the piston 20 is designed with several features that increase adiabaticity, reduce weight, and improve passive cooling performance without loss of power density. In an exemplary embodiment, a power density of greater than 0.65 kW/cm² is achieved with reduced parasitic losses in the form of over-dimensioned lubricant oil pumps. These engineered features are compatible with the present state of the art piston designs and are capable of improving energy efficiency and reducing fuel consumption by an estimated 1.5 to 2.0%. The reduced fuel consumption in turn ultimately reduces the carbon footprint associated with the diesel engine.

The body 22 is formed of a steel material and extends circumferentially around a center axis $A_c$ and longitudinally along the center axis $A_c$ from an upper end 30 to a lower end 32. The upper end 30 and lower end 32 define a height h therebetween. The body 22 also includes an outer surface 34 and an oppositely facing inner surface 36. The outer surface 34 presents a diameter D extending through and perpendicular to the center axis $A_c$. The height h and diameter D define a K factor, also referred to as a slenderness factor, which is equal to the height h divided by the diameter D. In the exemplary embodiments, the K factor is within a range of 1.1 to 1.6. The K factor of the exemplary piston 20 is typically greater, which means a more slender design, compared to currently used heavy-duty diesel pistons which typically have a K factor of 0.5 to 1.0. The longer, slender skirt walls 26 provide good guidance, act as a heat sink, and are flexible enough to mitigate slap noise. However, the piston 20 should also be designed with generous clearances all around, especially in the radial dimensions, to avoid scuffing and early seizures.

The crown 24 of the piston 20 is located at the upper end 30. In one embodiment, the crown 24, skirt walls 26, and pin bosses 28 are cast or forged into a single, monolithic piece of material. Alternatively, an upper portion of the crown 24 could be formed separate from a lower portion of the crown 24, and the two portions could be joined together, for example by welding. In this case, the lower portion of the crown 24 is typically integral with the skirt walls 26 and pin bosses 28.

The crown 24 includes an upper wall 38 at the upper end 30 for facing a combustion chamber when the piston 20 is disposed in the engine. The upper wall 38 presents an apex at the center axis $A_c$ and a bowl-shaped configuration surrounding the apex. In the exemplary embodiment, a thermal barrier coating 40, also referred to as an adiabatic coating, is applied to the outer surface 34 of the upper wall 38 to minimize the heat flow into the piston 20 and thus further optimize the cooling performance of the piston 20. The thermal barrier coating 40 is typically applied by a spraying technique, such as plasma spraying or high velocity oxygen fuel spraying (HVOF), to a thickness of 0.1 mm to 1.0 mm. A thickness of 0.5 mm is usually sufficient to provide the desired adiabaticity. The thermal barrier coating 40 is preferably formed of partially stabilized zirconia (PSZ), but can alternatively be formed from nickel, ceramic, or a proprietary coating having the trade name RoC™ (Robust Coating). The thermal barrier coating 40 also reduces the oil thermal stress level which provokes oil coking that occurs when operating at high temperatures.

The outer surface 34 of the crown 24 facing away from the center axis $A_c$ includes a ring belt with a plurality of ring grooves 42 disposed parallel to one another and extending circumferentially around the center axis $A_c$ for holding a plurality of piston rings 44. The ring grooves 42 including a top ring groove 42a, a bottom ring groove 42c, and could include one or more middle ring grooves 42b. The top ring groove 42a is typically disposed above the base of the combustion bowl, and the bottom ring groove 42c is disposed below the base of the combustion bowl. Various different types of piston rings 44 can be used with the piston 20 for scrapping oil along an inner surface of the cylinder liner.

In the exemplary embodiment shown in the Figures, a Dykes piston ring 44a having an L-shaped cross-section is disposed in the top ring groove 42a. The Dykes piston ring 44a includes an uppermost surface aligned with the outer surface 34 of upper wall 38 at the upper end 30 and an outermost surface disposed parallel to, and not inwardly of, the outer surface 34 of the crown 24 facing away from the center axis $A_c$. A distinctive feature of the Dykes piston ring 44a for this application is a very low or negligible tangential force. The preferred type of Dykes piston ring 44a is a zero tangential force ring due to its tolerance to thin, low viscosities and soot laden oil films, carbon scrapping ability, and heat dissipation. Conventional ring designs having a rectangular or asymmetric cross-section can also be used with the piston 20. Furthermore, due to recent advances in the design of piston rings, such as the scraping effectiveness and reduced tangential force, the piston 20 can be designed with only two piston rings 44 to reduce the height of the ring belt, frictional losses, and weight.

The pin bosses 28 of the body 22 extend longitudinally from the crown 24 to the lower end 32 and circumferentially about the center axis $A_c$. The pin bosses 28 are spaced from one another about the center axis $A_c$ by the skirt walls 26. Each of the pin bosses 28 defines a pin bore for receiving a wrist pin. The pin bores each surround a bore axis $A_b$ extending perpendicular to the center axis $A_c$ of the piston 20. In one embodiment, the pin bores are offset in a manner which reduces slap noise.

To achieve the improved cooling, the piston 20 is designed with a plurality of heat sink wells 46 in the skirt walls 26. The heat sink wells 46 extend axially and continuously from the upper wall 38 of the crown 24 toward the lower end 32 of the skirt wall 26. The heat sink wells 46 preferably extend to the lower end 32 of the skirt wall 26, but could extend along only a portion of the skirt wall 26. In the exemplary embodiment, the heat sink wells 46 are parallel to the center axis $A_c$ and are spaced from one another circumferential about the center axis $A_c$ by a portion of the skirt wall 26 formed of the steel material. Each heat sink well 46 typically presents a circumferential shape and a width $w_w$ or diameter extending perpendicular to the center axis $A_c$.

Each heat sink well 46 is at least partially filled with a cooling medium 48, which can be liquid or solid. In one embodiment, the cooling medium 48 is an oil or liquid coolant at room temperature, for example sodium-potassium alloy (NaK). A coolant having the trade name EnviroKool™ can alternatively be used as the cooling medium 48. In another embodiment, the cooling medium 48 is solid at room temperature, such as a tube formed of copper (Cu). In yet another embodiment, the cooling medium 48 is a low temperature fuse metal, or a metal which is solid at room temperature but liquefies at 60° C. to 200° C., for example sodium (Na). Another material that could be used as the cooling medium 48 is known as Wood's metal or MCP 158, which is an alloy of bismuth, lead, tin, and cadmium having a melting point of approximately 70° C. Materials which are solid at room temperature but become liquid at higher temperatures are typically ideal and good for emissions. During operation, the piston 20 gets hot quickly causing the cooling medium 48 to liquefy and begin its cooling action.

When the cooling medium 48 is in liquid form, the piston dynamics provoke a "cocktail shaker" effect causing oil to splash along the inner surface 36 of the crown 24, which is typically the hottest part of the piston 20, and transfer the heat from the crown 24 to cooler sections of the piston 20. The heat absorbed and released is directly proportionate to the kinetic energy imparted to the cooling medium 48, which is a function of the heat sink well depth, the piston speed, and/or the engine revolutions. Thus, a naturally regulating mechanism of heat transfer is established.

The heat sink wells 46 can be formed by casting or forging the upper wall 38 of the crown 24 and the skirt walls 26 to a shape which defines a well opening at the lower end 32. The open well is then filled with the cooling medium 48 and permanently sealed by forming a lower wall 50 at the lower end 32 of the skirt wall 26. Alternatively, the heat sink wells 46 can be drilled into the skirt walls 26 after casting or forging the crown 24 and skirt walls 26. In another embodiment, the filled heat sink wells 46 are formed by casting the copper tubes into the steel skirt walls 26, such that no additional machining is required.

Figure 3:
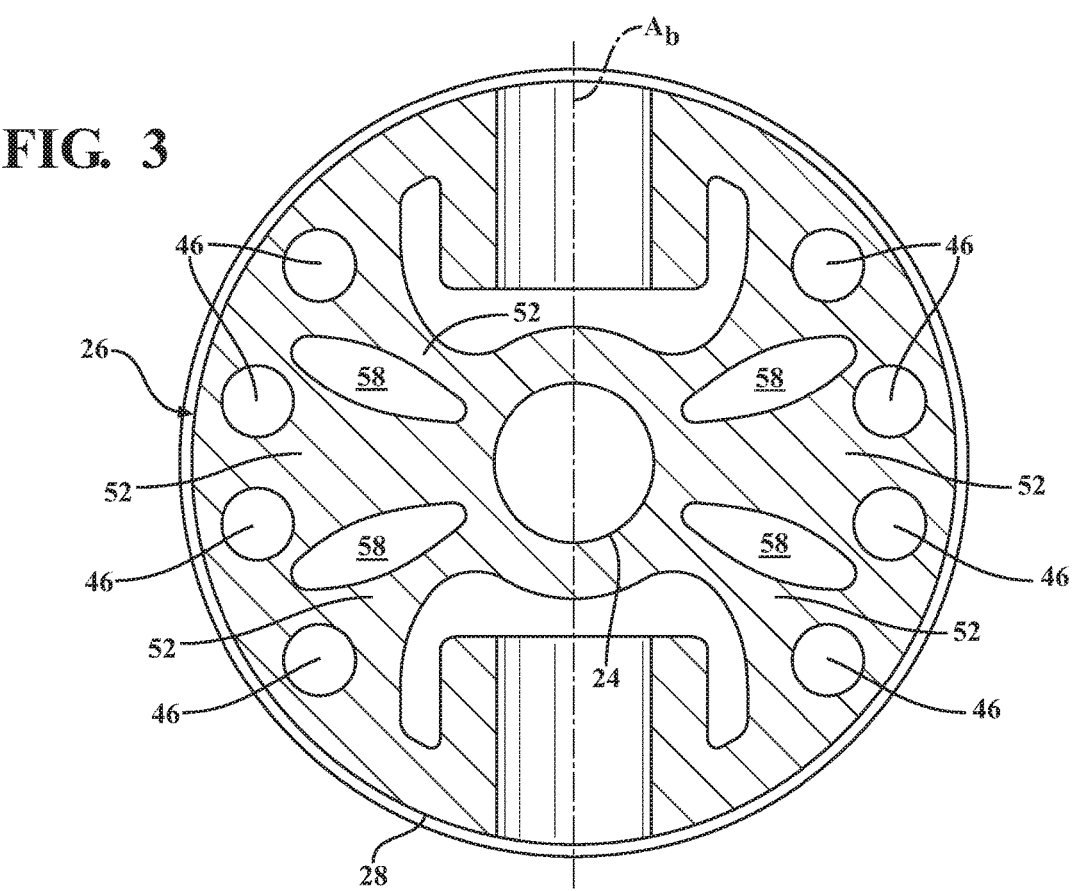
FIG. 3 is a cross-sectional top view of the piston of FIG. 1.

The thermal performance of the piston 20 is further improved by an extensively ribbed undercrown. The body 22 includes a plurality of ribs 52 each extending radially inwardly and upwardly at an angle or approximately 20 to 50 degrees from a first rib end 54 at the inner surface 36 of the skirt wall 26 to a second rib end 56 at the inner surface 36 along a boss of the upper wall 38. Each rib 52 is radially aligned with one of the heat sink wells 46 and extends radially inwardly from the inner surface 36 of the skirt wall 26 adjacent the radially aligned heat sink well 46. The ribs 52 are located circumferentially about the center axis $A_c$, and each rib 52 is spaced from the adjacent rib 52 at the first rib end 54 by the portion of the skirt wall 26 spacing the heat sink well 46 from the adjacent heat sink well 46. The second rib ends 56 attached to the boss of the crown 24 are disposed closer to one another than the first rib ends 54. As shown in FIG. 3, each rib 52 is spaced from the adjacent rib 52 between the first rib end 54 and the second rib end 56 by a void 58 free of a solid or liquid material. Each rib 52 presents a width $w_r$ extending parallel to the center axis $A_c$, and the width $w_r$ of the rib 52 is typically 0.5 to 1.5 times the width $w_w$ of the adjacent heat sink well 46. As shown in the Figures, each rib 52 defines an enlarged portion of the heat sink well 46 along the inner surface 36 of the upper wall 38, which is integral with the cylindrical portion of the heat sink well 46. In addition to dissipating heat toward the crankcase, the spaced apart ribs 52 provide mechanical integrity without adding much weight. The ribs 52 provide structural support and thus can take the place of a heavier solid wall used to form a conventional undercrown cooling gallery.

The example pistons 20 designs also include at least one oil opening 60 or oil drainage hole extending radially through the crown 24 adjacent or along the ring grooves 42, and/or though the skirt walls 26 for conveying oil scrapped by the piston rings 44 toward the inner surface 36 of the piston 20. The oil openings 60 could also be located along the pin bosses 28. The oil openings 60 prevent the lubricating oil from accumulating ahead of the piston ring 44. The oil openings 60 are also designed to ensure that the issuing oil jet velocity compounds with the speed of the piston 20, so that the resultant vector of oil directs itself toward the crown 24, pin bosses 28, and/or wrist pin. This mechanism provides for additional lubrication and cooling to starved areas without any additional expenditure of energy.

Figure 4:
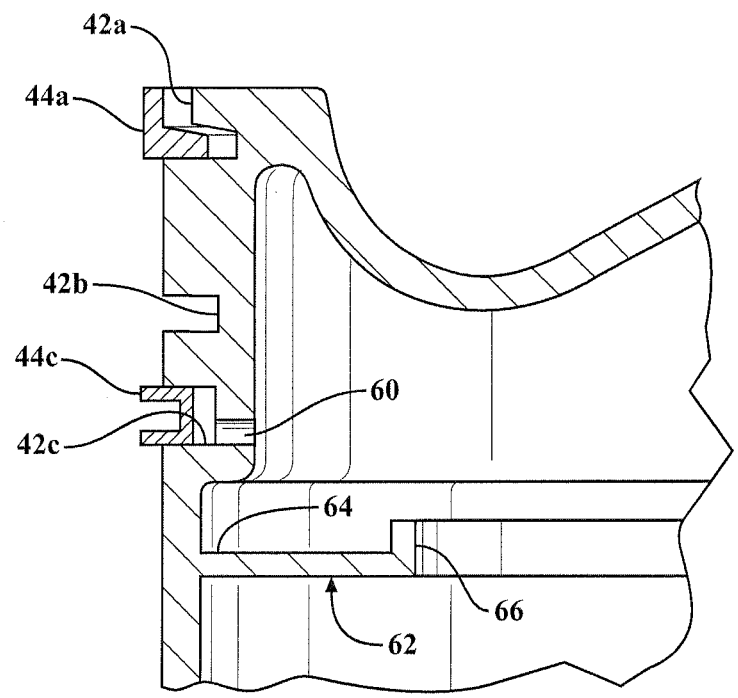
FIG. 4 is another cross-sectional side view of the piston of FIG. 1 showing an oil opening and a tray for collecting oil.
Figure 5:
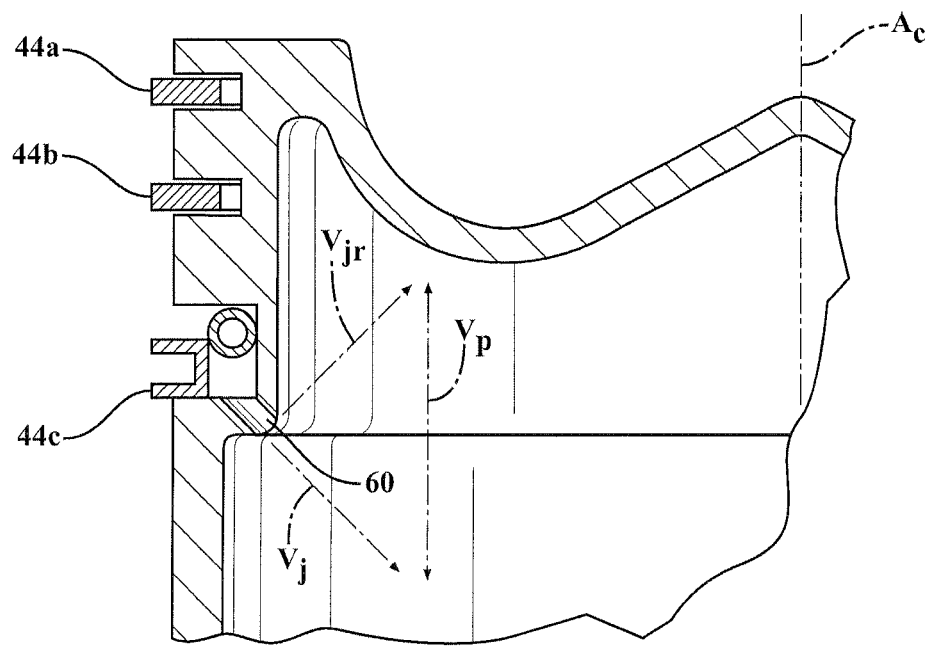
FIG. 5 is a cross-sectional side view of a piston with an oil opening according to another example embodiment.

FIGS. 4 and 5 show exemplary locations of the oil openings 60. In FIG. 4, one of the oil openings 60 is shown to extend through the crown 24 at the bottom ring groove 42 in an area above the pin boss 28. In this case, the oil opening 60 is perpendicular to the center axis $A_c$. In FIG. 5, the oil opening 60 extends downwardly at an angle through the crown 24 at the bottom ring groove 42 so that a jet of oil can be conveyed therethrough. In this embodiment, the oil drainage hole provides a jet of oil animated by a vertical velocity Vj and the piston 20 itself is animated by a vectoral velocity Vp. The combination of Vj and Vp can be worked out to result in the vectoral oil jet velocity Vjr shown in FIG. 5. In this embodiment, the Vjr is zero at both the top dead center and bottom dead centers because Vj and Vp will be simultaneously zero at these points. However, as the piston 20 moves down from top dead center in its stroke, oil scrapped from the cylinder liner tries to accumulate ahead of the piston ring 44, but is prevented from doing so by the oil drainage hole 60. Dynamic oil pressures of up to 2.0 bar have been calculated and measured, which gives birth to the Vj. At the same time, the piston 20 speed Vp increases and in combination with the Vj creates the Vjr. The inclination of the oil drainage hole 60 relative to the horizontal plane and diameter of the drainage hole 60 are estimated from the presumed thickness of the oil, piston diameter, piston stroke, engine speed, and target. An inclination of less than 45 typically achieves the target.

The piston 20 can be designed with a plurality of trays 62 each disposed below one of the oil openings 60 for collecting the oil conveyed through the oil openings 60. Each tray 62 extends radially inwardly and perpendicular to the center axis $A_c$ from a first tray end 64 to a second tray end 66, which is a distal end spaced radially from the center axis $A_c$.

FIG. 4 shows an example of one of the trays 62. Alternatively, the piston 20 can include a single tray 62 extending circumferentially around the center axis $A_c$ for collecting the oil from multiple oil openings 60. Oil collected in the trays 62 then splashes against the inner surface 36 of the piston 20 as it reciprocates in the internal combustion engine to improve cooling. The oil collected in the trays 62 can transfer heat to the sump oil, such that no additional oil pumping or expenditure of energy is necessary.

Another aspect of the invention provides a method of manufacturing the piston 20 for the internal combustion engine. The method generally includes providing the body 22 formed of metal material, preferably steel, having the engineered features described above. In one embodiment, the step of providing the piston 20 typically includes casting or forging the metal material to form the piston 20. In one embodiment, the metal is cast or forged into the monolithic design, wherein the crown 24 and skirt walls 26 are a single, integral piece of material. Alternatively, the upper portion of the crown 24 can be welded to the lower portion of the crown 24, for example by friction, laser, and/or electron beam welding.

The heat sink wells 46 provided in the skirt walls 26 of the piston 20 can be either cast in or drilled in to the piston 20. In one embodiment, the copper tubes are cast into the skirt walls 26 at the same time the steel material is cast into the appropriate shape. In another embodiment, the wells are drilled into the skirt walls 26 after the casting or forging step, the wells are filled with the cooling medium 48, and then the lower wall 50 is placed along the lower end 32 of the skirt wall 26 to seal the cooling medium 48 inside the heat sink wells 46. In yet another embodiment, the open wells are formed during the forging or casting step, filled with the cooling medium 48, and then sealed.

In the exemplary embodiment, the method also includes applying the thermal barrier coating 40 onto the outer surface 34 of at the upper end of the crown 24 to a thickness of 0.1 mm to 1.0 mm. The thermal barrier coating 40 is preferably applied by spraying, for example high velocity oxygen fuel spraying (HVOF), but can alternatively be applied by other methods.

Obviously, many modifications and variations of the present invention are possible in light of the above teachings and may be practiced otherwise than as specifically described while within the scope of the appended claims.

What is claimed is:

1. A piston, comprising:

a body formed of a metal material extending along a center axis from an upper end to a lower end, said body presenting an outer surface and an inner surface, said body including a crown having an upper wall at said upper end;

said body including skirt walls extending longitudinally from said crown to said lower end, said skirt walls and said upper wall of said crown defining a plurality of heat sink wells extending axially from said upper wall toward said lower end of said skirt wall, each of said heat sink wells being at least partially filled with a cooling medium and sealed by said skirt wall and said upper wall of said crown and a lower wall at said lower end of said skirt wall;

said body including a plurality of ribs each extending radially inwardly from a first rib end at said inner surface of said skirt wall to a second rib end at said inner surface of said upper wall; and said body presenting a piston height extending from said upper end to said lower end, said outer surface along said skirt walls presenting a piston diameter extending through and perpendicular to said center axis, a piston length and said piston diameter defining a K factor equal to said piston height divided by said piston diameter, and said K factor being within a range of 1.1 to 1.6.

2. The piston of claim 1, wherein said heat sink wells are spaced from one another circumferential by a portion of said skirt wall, each rib is radially aligned with one of said heat sink wells and extends radially inwardly from said inner surface adjacent said radially aligned heat sink well.

3. The piston of claim 2, wherein each rib is spaced from the adjacent rib by a void.

4. The piston of claim 2, wherein each heat sink well presents a well width extending perpendicular to said center axis, and each rib presents a rib width extending parallel to said center axis being 0.5 to 1.5 times said well width of said adjacent heat sink well.

5. The piston of claim 1, wherein said cooling medium at least partially filling said heat sink wells of said skirt walls is selected from oil, liquid coolant, sodium (Na), an alloy of sodium and potassium (NaK), and a tube formed of copper (Cu).

6. The piston of claim 1, wherein said outer surface of said crown facing away from said center axis includes a plurality of ring grooves extending circumferentially around said center axis for holding a plurality of piston rings.

7. The piston of claim 6 including a piston ring having an L-shaped cross-section disposed in one of said ring grooves, said piston ring having an uppermost surface aligned with said outer surface of said upper wall at said upper end and an outermost surface disposed parallel to said outer surface of said crown facing away from said center axis.

8. The piston of claim 6, wherein at least one of said crown and said skirt walls presents at least one oil opening disposed along or adjacent at least one of said ring grooves, said at least one oil opening extending radially from said outer surface to said inner surface for conveying oil toward said inner surface.

9. The piston of claim 1 including a thermal barrier coating applied to said outer surface of said upper wall at said upper end, said thermal barrier coating having a thickness of 0.1 mm to 1.0 mm, and said thermal barrier coating including partially stabilized zirconia (PSZ).

10. The piston of claim 1, wherein the metal material of the body is steel.

11. The piston of claim 1, wherein said body includes a pair of pin bosses having pin bores, and wherein said heat sink wells in said skirt walls are spaced circumferentially from said pin bosses.

12. A piston, comprising:
a body formed of a metal material extending along a center axis from an upper end to a lower end, said body presenting an outer surface and an inner surface,
said body including a crown having an upper wall at said upper end;
said body including skirt walls extending longitudinally from said crown to said lower end, said skirt walls and said upper wall of said crown defining a plurality of heat sink wells extending axially from said upper wall toward said lower end of said skirt wall, each of said heat sink wells being at least partially filled with a cooling medium and sealed by said skirt wall and said upper wall of said crown and a lower wall at said lower end of said skirt wall;
said body including a plurality of ribs each extending radially inwardly from a first rib end at said inner surface of said skirt wall to a second rib end at said inner surface of said upper wall;
said outer surface of said crown facing away from said center axis includes a plurality of ring grooves extending circumferentially around said center axis for holding a plurality of piston rings;
at least one of said crown and said skirt walls presenting at least one oil opening disposed along or adjacent at least one of said ring grooves, said at least one oil opening extending radially from said outer surface to said inner surface for conveying oil toward said inner surface; and
said body includes a tray for collecting oil extending radially inwardly from a first tray end at said inner surface axially below said at least one oil opening to a second tray end, said second tray end being a distal end spaced radially from said center axis.

13. A piston, comprising:
a body formed of a steel material and extending circumferentially around a center axis and longitudinally along said center axis from an upper end to a lower end, said body defining a piston height extending from said upper end to said lower end;
said body presenting an outer surface and an oppositely facing inner surface, said outer surface presenting a piston diameter extending through and perpendicular to said center axis;
a piston length and said piston diameter defining a K factor, said K factor being equal to said piston height divided by said piston diameter, said K factor being within a range of 1.1 to 1.6;
said body including a crown at said upper end;
said crown including an upper wall at said upper end for facing a combustion chamber, said outer surface of said upper wall including an apex at said center axis and a bowl-shaped configuration surrounding said apex;
a thermal barrier coating applied to said outer surface of said upper wall, said thermal barrier coating having a thickness of 0.1 mm to 1.0 mm, and said thermal barrier coating including partially stabilized zirconia (PSZ);
said outer surface of said crown facing away from said center axis including a plurality of ring grooves extending circumferentially around said center axis for holding a plurality of piston rings;
said ring grooves including a top ring groove and a bottom ring groove, said top ring groove being disposed above said apex of said upper wall and said bottom ring groove being disposed below said apex of said upper wall;
said body including a pair of pin bosses extending longitudinally from said crown to said lower end, said pin bosses being spaced from one another and extending circumferentially about said center axis;
each of said pin bosses defining a pin bore for receiving a wrist pin, said pin bores each surrounding a bore axis extending perpendicular to said center axis of said body;
said body including a pair of skirt walls extending longitudinally from said crown to said lower end, said skirt walls being spaced from one another by said pin bosses and extending circumferentially about said center axis;
said skirt walls and said upper wall of said crown presenting a plurality of heat sink wells extending axially and continuously from said upper wall of said crown to said lower end of said skirt wall, each of said heat sink wells being at least partially filled with a cooling medium, said heat sink wells being sealed by said surrounding skirt wall and said upper wall of said crown and a lower wall at said lower end of said skirt wall, at least a portion of said heat sink wells being parallel to said center axis and spaced from one another circumferential about said center axis by a portion of said skirt wall formed of said steel material, each of said heat sink wells presenting a width extending perpendicular to said center axis, and each of said heat sink wells presenting a circumferential shape;

said body including a plurality of ribs each extending radially inwardly and upwardly at an angle from a first rib end at said inner surface of said skirt wall to a second rib end at said inner surface along a boss of said upper wall, each rib being radially aligned with one of said heat sink wells and extending radially inwardly from said inner surface of said skirt wall adjacent said radially aligned heat sink well, said ribs being spaced from one another circumferentially about said center axis, each of said ribs being spaced from the adjacent rib at said first rib end by said portion of said skirt wall spacing said heat sink well from the adjacent heat sink well, said second rib ends being disposed closer to one another than said first rib ends, each of said ribs being spaced from the adjacent rib between said first rib end and said second rib end by a void free of a solid or liquid material, each of said ribs presenting a width extending parallel to said center axis, said width being 0.5 to 1.5 times said width of said adjacent heat sink well; and said cooling medium at least partially filling said heat sink wells of said skirt walls being selected from oil, liquid coolant, sodium (Na), an alloy of sodium and potassium (NaK), and a tube formed of copper (Cu).

14. A method of manufacturing a piston, comprising the steps of:
providing a body formed of a metal material extending along a center axis from an upper end to a lower end, the body presenting an outer surface and an inner surface, the body including a crown having an upper wall at the upper end, the body including skirt walls extending longitudinally from the crown to the lower end, the skirt walls and the upper wall of the crown defining a plurality of heat sink wells extending axially from the upper wall toward the lower end of the skirt wall, each of the heat sink wells being hollow and sealed by the skirt wall and the upper wall of the crown and the lower wall at the lower end of the skirt wall; the body including a plurality of ribs each extending radially inwardly from a first rib end at the inner surface of the skirt wall to a second rib end at the inner surface of the upper wall; the body presenting a piston height extending from the upper end to the lower end, the outer surface along the skirt walls presenting a piston diameter extending through and perpendicular to the center axis, a piston length and the piston diameter defining a K factor equal to the piston height divided by the piston diameter, and the K factor being within a range of 1.1 to 1.6.

15. The method of claim 14, wherein the step of providing the piston body includes casting or forging metal material to form the crown, the skirt walls, the heat sink wells, and the ribs.

16. The method of claim 15, wherein the step of providing the piston body includes casting, and including the step of casting a plurality of copper tubes in the heat sink wells of the skirt walls.

17. The method of claim 14, wherein the step of providing the piston body includes casting or forging metal material to form the crown and the skirt walls, and drilling the heat sink wells into the skirt walls.

18. The method of claim 14, wherein the step of providing the piston body includes welding an upper portion of the piston body including the crown to a lower portion of the piston body including the skirt portions.

19. The method of claim 14, including spraying a thermal barrier coating onto the outer surface of the upper wall to a thickness of 0.1 mm to 1.0 mm, wherein the thermal barrier coating includes partially stabilized zirconia (PSZ).

20. The method of claim 14, wherein the heat sink wells are spaced from one another circumferential by a portion of the skirt wall, each rib is radially aligned with one of the heat sink wells and extends radially inwardly from the inner surface adjacent the radially aligned heat sink well, each rib presents an enlarged portion of the heat sink well along the inner surface of the upper wall and is spaced from the adjacent rib by a void, each heat sink well presents a well width extending perpendicular to the center axis, and each rib presents a rib width extending parallel to the center axis being 0.5 to 1.5 times the well width of the adjacent heat sink well.

* * * * *